(12) United States Patent
Marin

(10) Patent No.: US 11,504,209 B2
(45) Date of Patent: Nov. 22, 2022

(54) CENTERING DEVICE FOR INSERTING OF A DENTAL IMPLANT

(71) Applicant: Carlo Marin, Vallonara di Marostica (IT)

(72) Inventor: Carlo Marin, Vallonara di Marostica (IT)

( * ) Notice: Subject to any disclaimer, the term of this patent is extended or adjusted under 35 U.S.C. 154(b) by 963 days.

(21) Appl. No.: 16/322,286

(22) PCT Filed: Aug. 3, 2017

(86) PCT No.: PCT/IB2017/054751
§ 371 (c)(1),
(2) Date: Jan. 31, 2019

(87) PCT Pub. No.: WO2018/025213
PCT Pub. Date: Feb. 8, 2018

(65) Prior Publication Data
US 2019/0183606 A1    Jun. 20, 2019

(30) Foreign Application Priority Data

Aug. 3, 2016   (IT) .......................... 102016000081488

(51) Int. Cl.
*A61C 3/00* (2006.01)
*A61C 1/08* (2006.01)
(Continued)

(52) U.S. Cl.
CPC ............ *A61C 1/084* (2013.01); *A61C 8/0089* (2013.01); *A61C 5/44* (2017.02)

(58) Field of Classification Search
CPC .......... A61C 8/0089; A61C 1/084; A61C 5/44
(Continued)

(56) References Cited

U.S. PATENT DOCUMENTS

2004/0013999 A1    1/2004  Sussman

FOREIGN PATENT DOCUMENTS

DE   202007016798 U1   2/2008
JP       2004500164 A *   1/2004
(Continued)

*Primary Examiner* — Robert Chevalier
(74) *Attorney, Agent, or Firm* — Amter, Rothstein & Ebenstein; Steven Hertzberg

(57) ABSTRACT

The present invention relates to a centering and guiding device (1) for a dental drill which comprises a body (10) including a guiding hole (15) for a dental drill and two arms (20, 30) pivotally coupled to the body (10). Each arm includes a respective free end (22, 32). Said arms (20,30) are capable of pivoting between a first open position, in which said respective free ends (22, 32) are mutually spaced apart to promote the movement of the device (1) from and towards an operating surface, and a second closed position, in which the free ends (22, 32) are approached to each other to match an operating surface. The device according to the invention also comprises an elastic element (40) to push the arms (20, 30) towards the closed position. According to the invention, each of said arms (20, 30) comprises a cylindrical end (27, 37), opposite to the corresponding free end (22, 32), accommodated in a corresponding seat (10A) defined by the body (10). Moreover, the cylindrical ends (27, 37) of said arms (20, 30) comprise respective toothed sectors (25, 35) mutually meshing each other to guide the rotation of said arms (20, 30) between said closed and open positions.

24 Claims, 10 Drawing Sheets

(51) Int. Cl.
  *A61C 8/00* (2006.01)
  *A61C 19/04* (2006.01)
  *A61C 5/44* (2017.01)

(58) Field of Classification Search
  USPC .................. 433/50, 53, 55, 56, 61, 68, 69
  See application file for complete search history.

(56) References Cited

FOREIGN PATENT DOCUMENTS

| | | | |
|---|---|---|---|
| JP | WO-2007021099 A1 | * | 2/2007 |
| JP | 2007209739 A | | 8/2007 |
| JP | 201676028 U | * | 12/2010 |
| JP | 20130113777 A | * | 10/2013 |
| WO | 2009115617 A1 | | 9/2009 |

* cited by examiner

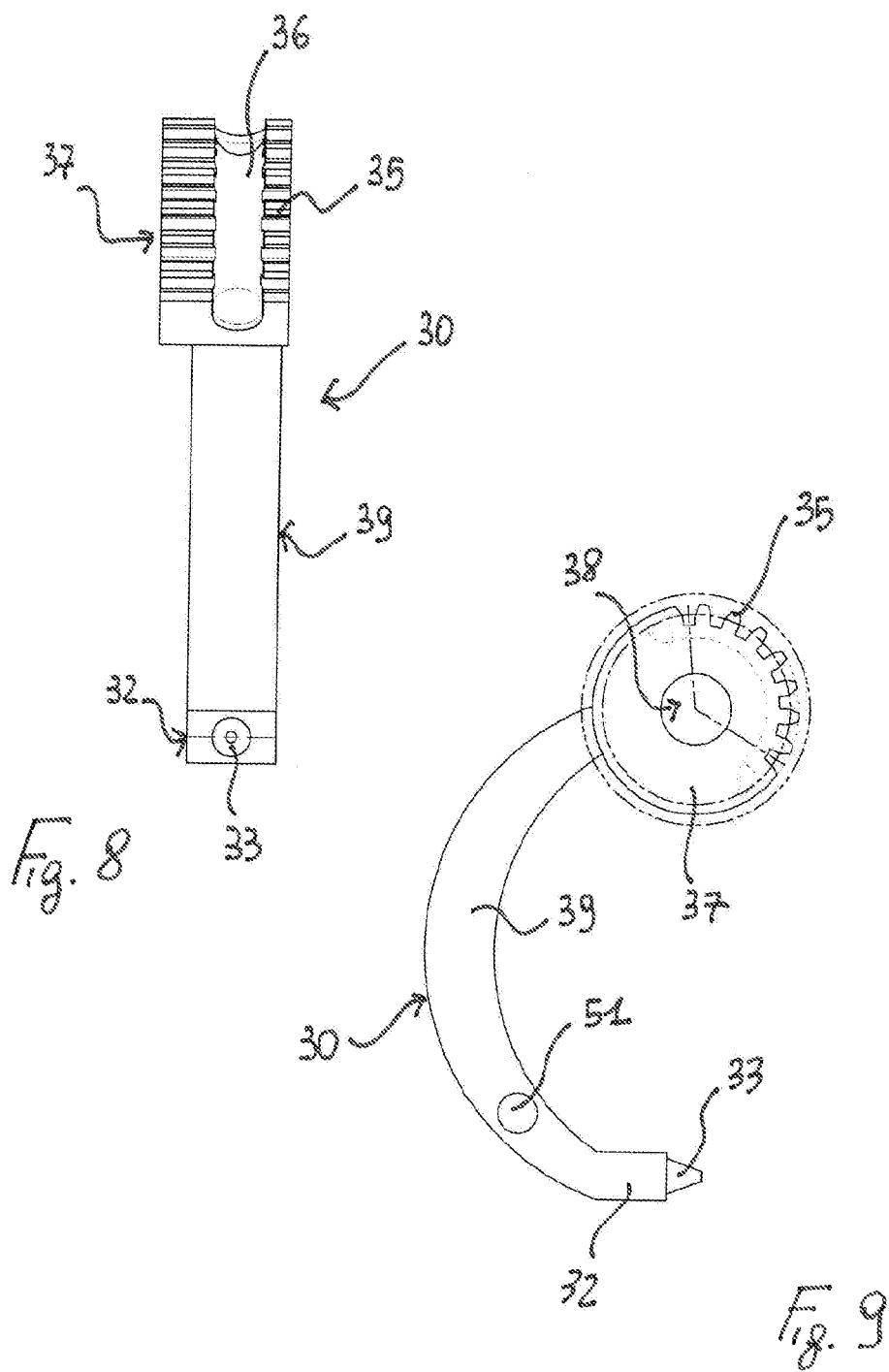

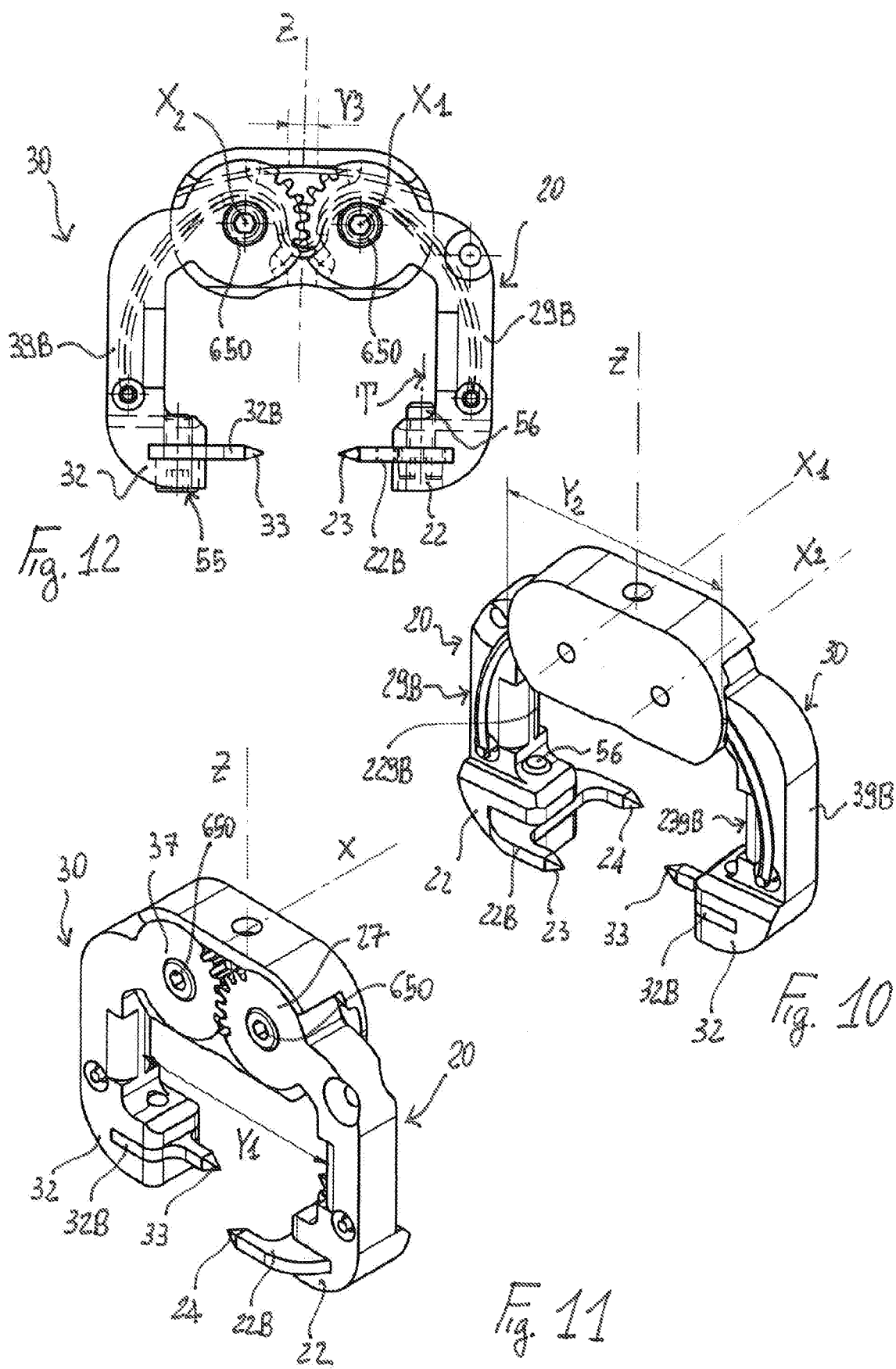

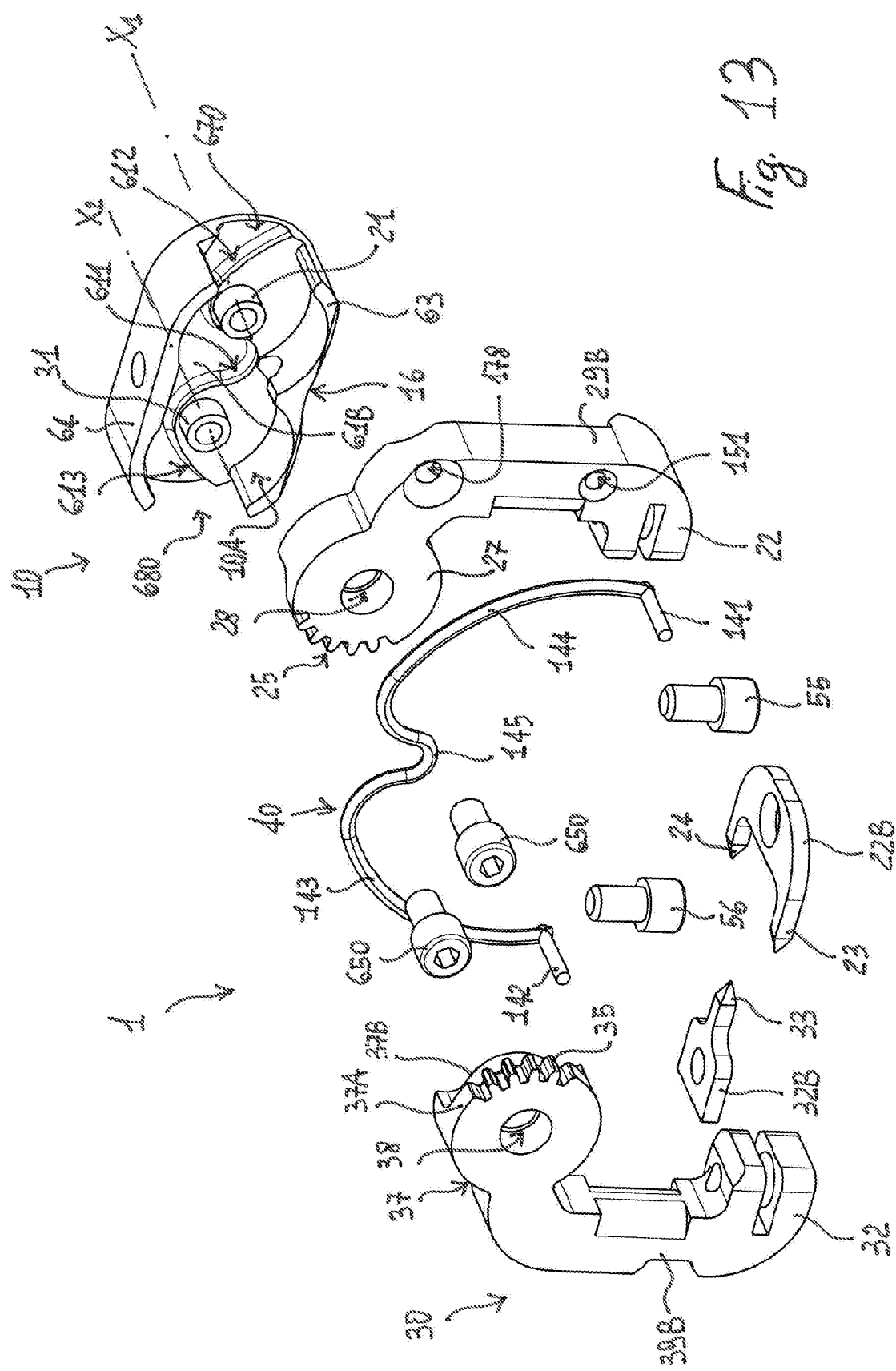

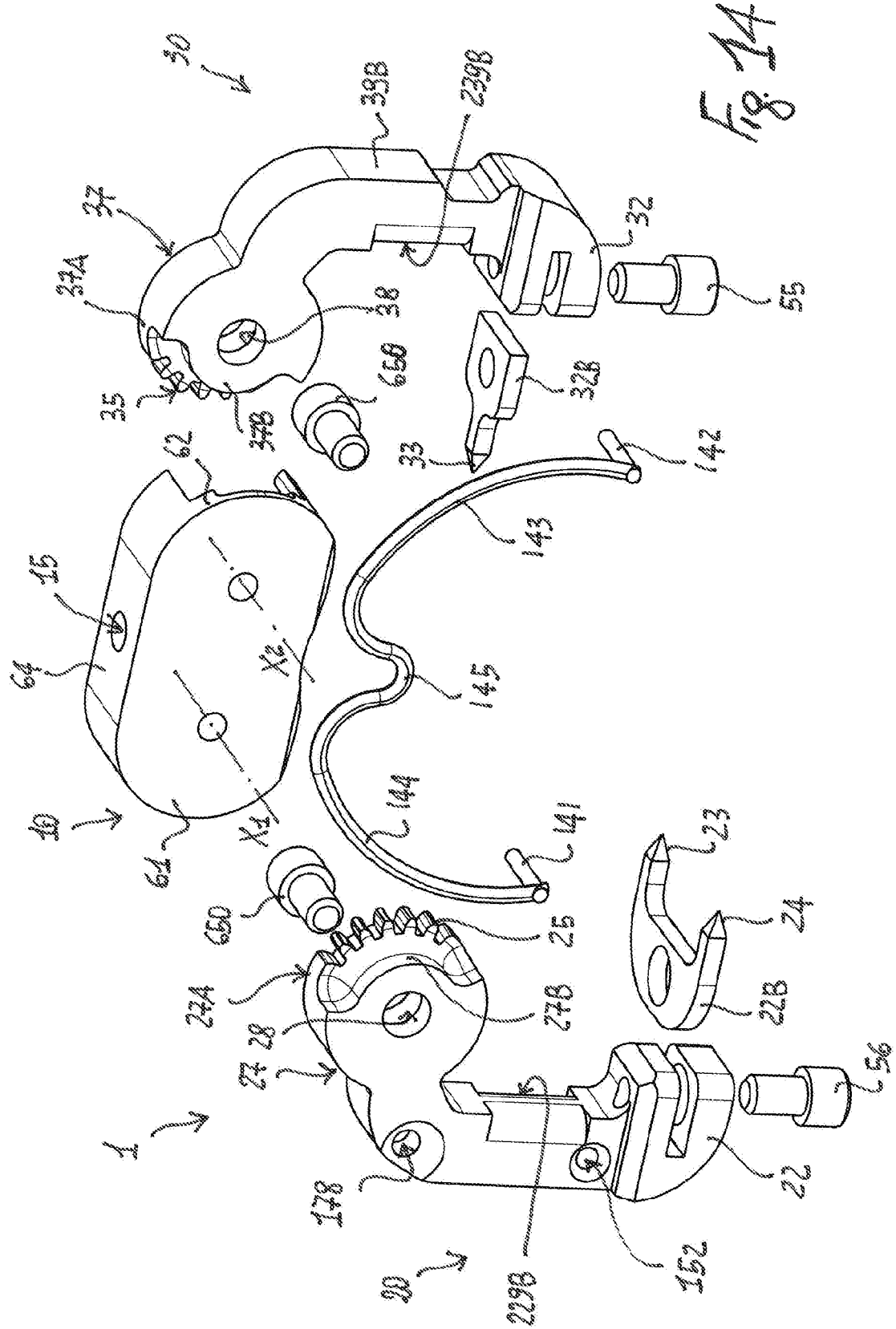

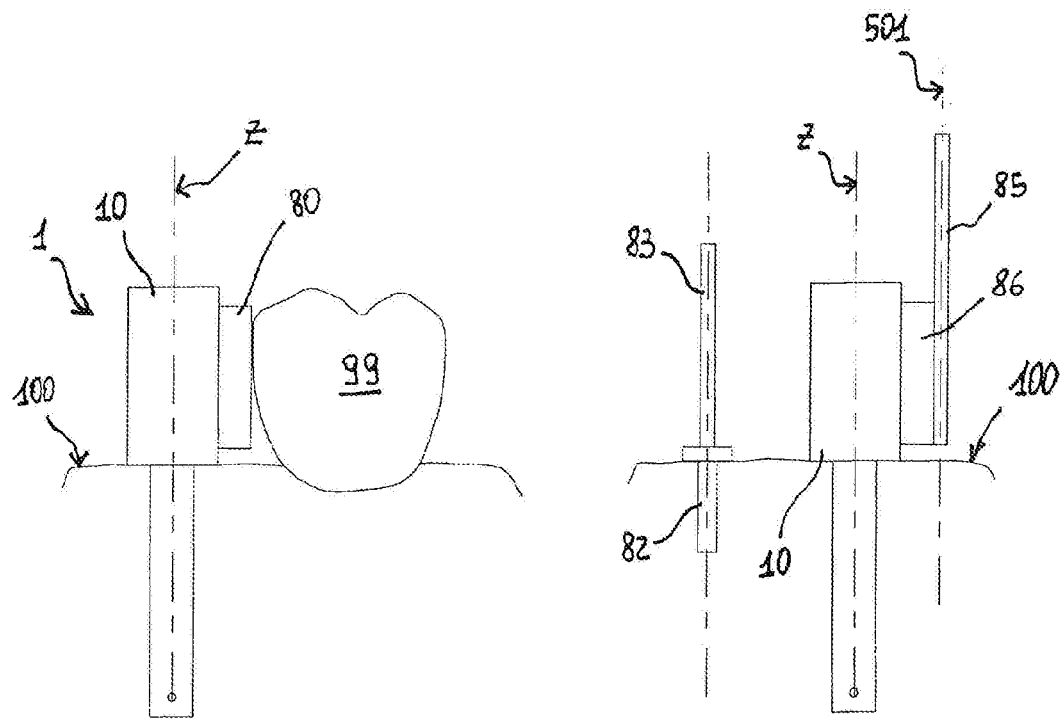
Fig. 15
Fig. 16
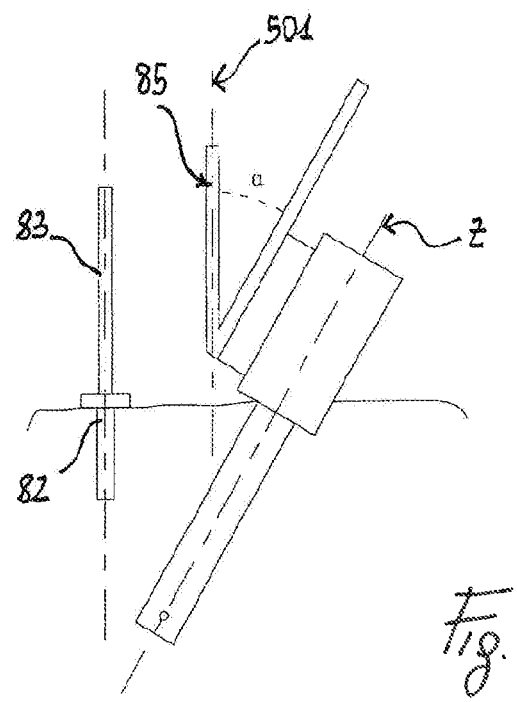
Fig. 17

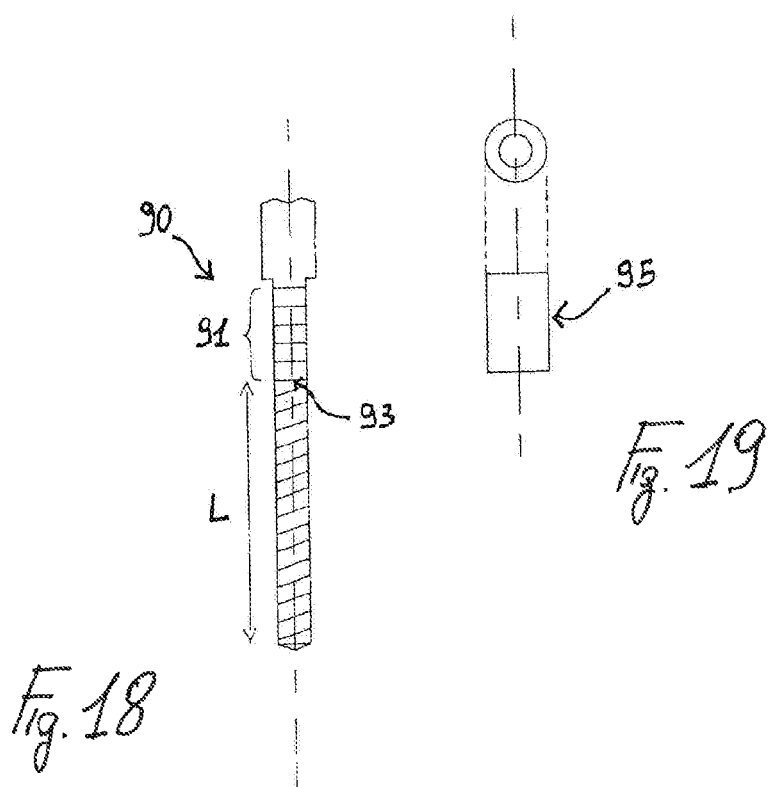
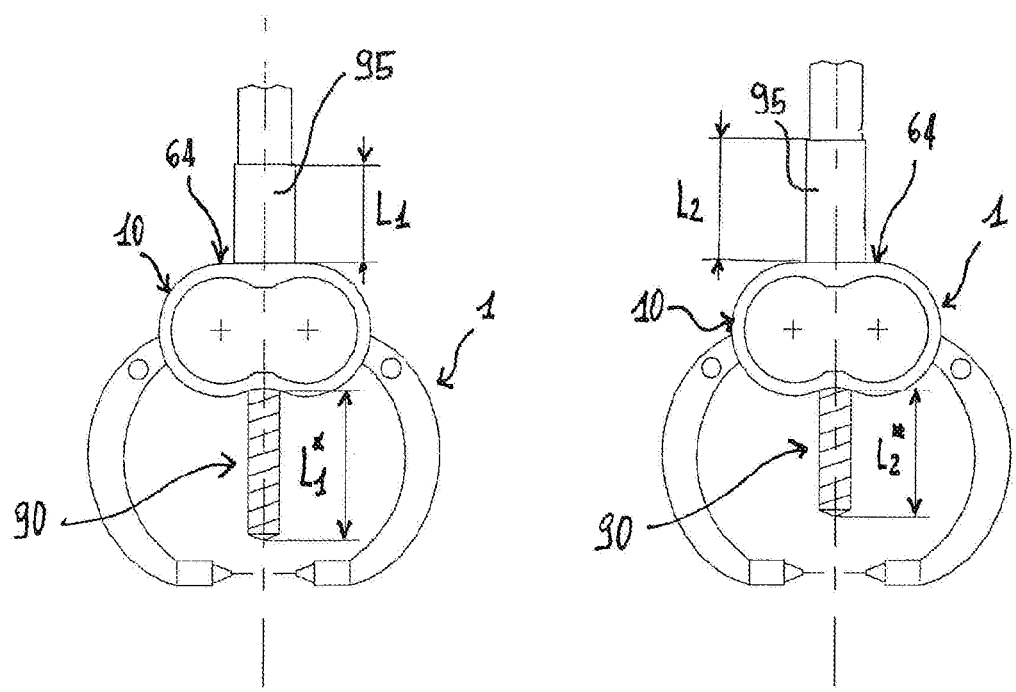

CENTERING DEVICE FOR INSERTING OF A DENTAL IMPLANT

CROSS REFERENCE TO RELATED APPLICATIONS

This application is a national phase of PCT application No. PCT/IB2017/054751, filed Aug. 3, 2017, which claims priority to IT patent application No. 102016000081488, filed Aug. 3, 2016, all of which are incorporated herein by reference thereto.

FIELD OF THE INVENTION

The present invention relates to the field of manufacturing of dental devices. More precisely, the invention relates to a centering device for the correct insertion of a dental implant.

BACKGROUND ART

As is known, a dental implant is intended to create an artificial root for an artificial tooth or prosthetic structure. More precisely, a dental implant consists of a screw intended to be surgically inserted into the maxillary/mandibular bone of a patient, and a pillar (also called stump) whose function is to create a connection between the screw and the artificial tooth. In the following description, the term "implant" and the term "screw" have the same meaning.

It is also known that the process of inserting a dental implant can be carried out according to a surgical technique involving the prior cutting of the gum. This technique is used when the tooth has just been removed (instant implants) or lost for some time (delayed implants). Trans-mucosal implantology, also called flapless, involves the insertion of the dental implant without the prior cutting of the gum. In instant implants, the implant is inserted in the same seat from which the tooth is extracted.

In all cases, the dental implant requires planning the position where to fix the screw. To this end, a computed axial tomography (CT SCAN) or a CBCT (Cone Beam Computed Tomography) are carried out in advance, through which bone morphology related images are obtained at the region where the dental implant will be inserted. In the case of extended dentures, i.e. when inserting several dental implants, a "template" is normally created which defines a plurality of holes for the drills, intended to penetrate in the maxillary or mandibular bone. These guiding holes will be suitably enlarged and used for the insertion of the corresponding implants/screws.

The main drawbacks of this solution are:
the template first requires detecting the morphology of the anatomical parts involved in the intervention through a CT scan or a CBCT;
the template requires a waiting period for its carrying out;
the execution costs of the template are relevant and in any case such as to make the use thereof little convenient in the case of single or small number implants;
the structure of the template does not exactly reproduce the morphology of the anatomical parts involved since the transfer to the template of information derived from the image provided by the CT scan or CBCT is faulty due to several inaccuracies which cannot be quantified and checked.

In addition, it can be seen that in the case of a single dental implant, intended for a single artificial tooth, or two implants next to each other intended to support bridges or dentures of a limited extension, no guide is manufactured but the implant placement, as regards the inclination in the mesio-distal and vestibule-lingual direction is actually left to the dentist's sensitivity and skills.

It is the object of the present invention to overcome the drawbacks mentioned above with reference to the prior art by a centering device for the insertion of a dental implant, capable of guiding the insertion direction of the implant with the required tolerance.

It is another object to provide a device of the above type which is also self-centering, so as to allow in any case the bone to be drilled while keeping the position with respect to the maxillary/mandibular bone structure involved in the intervention centered.

It is a further object to provide a device of the above type which has a shape independent of the patient's anatomical morphology.

SUMMARY

These objects are substantially achieved by a centering device for inserting a dental implant comprising:
a body including a guiding hole for a dental drill,
two arms pivotally constrained to said body and including two respective free ends, said arms being capable of pivoting between a first open position, in which said respective free ends are mutually spaced apart to promote the movement of the device from and towards an operating surface, and a second closed position, in which the free ends are approached to each other to match an operating surface,
an elastic element adapted to push the arms towards said closed position.

According to the invention, each of the arms of the device comprises a cylindrical end opposite to the corresponding free end mentioned above. The body defines a pair of at least partially cylindrical seats in each of which a cylindrical end of one of the arms is accommodated. Moreover, according to the invention, the cylindrical ends of the arms comprise respective toothed sectors mutually meshing each other to guide the rotation of the same arms between the closed and open positions. Advantageously, the seats defined by the body of the device guide the rotation of the two arms between the closed and open positions. The meshing between the toothed sectors makes the rotation of the two arms advantageously synchronous.

BRIEF DESCRIPTION OF THE DRAWINGS

Further features and advantages of the present invention will become more apparent from the indicative, non-limiting description of a preferred but non-exclusive embodiment of a centering device for the insertion of a dental implant, as shown in the accompanying drawings, in which:

FIGS. 8 and 9 are a lateral view and a front view, respectively, of another component of the device in FIG. 1;

FIGS. 10 and 11 are perspective views, from opposite observation points, of a second embodiment of a guiding and centering device according to the present invention;

FIG. 12 shows a front view of the device in FIGS. 10 and 11;

FIGS. 13 and 14 are exploded views, from opposite observation points, of the device in FIGS. 10 to 12;

FIGS. 15, 16 and 17 are views of components of a kit for providing a dental implant comprising a device according to the present invention;

FIGS. 18 to 21 are views of further components of a kit for providing a dental implant according to the invention and comprising a device according to the present invention.

The same reference numerals and letters in the figures identify the same elements or components.

DETAILED DESCRIPTION

With reference to the accompanying figures, a centering device 1 for inserting a dental implant is described hereinafter. Device 1 has the function of guiding, after being placed in centered position in the mandibular or maxillary operating area, a dental drill which must pierce a maxillary/mandibular bone for the subsequent insertion of the implant screw.

Figure 3:
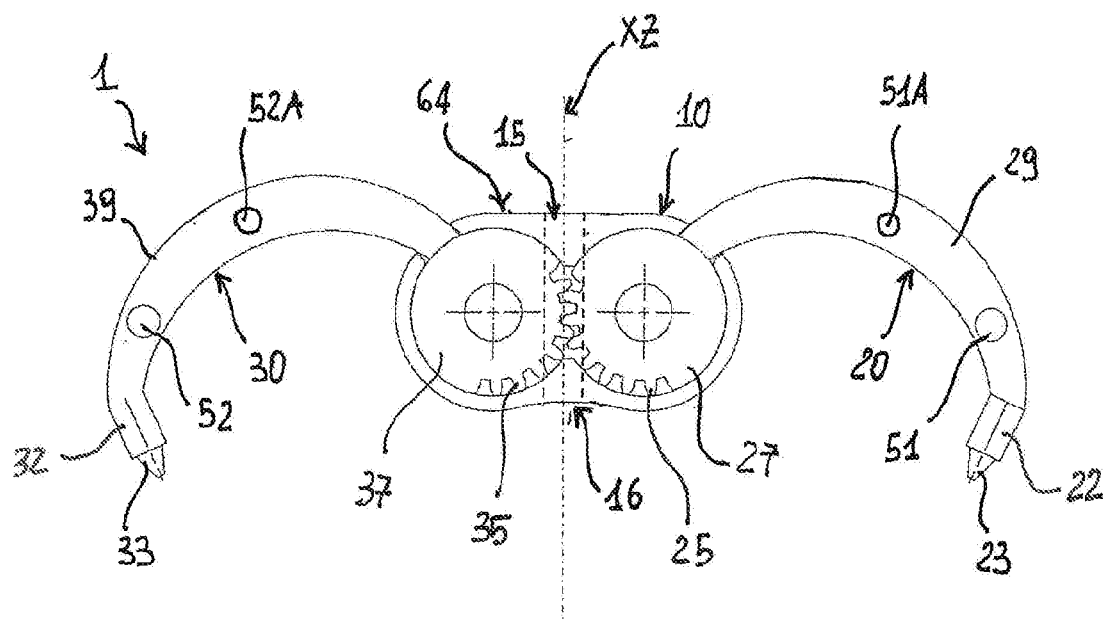
FIG. 3 is a front view of the device in FIG. 1 in a first operating configuration.

Device 1 comprises a body 10 and two arms 20, 30, left and right, respectively. In a first possible embodiment, arms 20, 30 are rotating about two respective pins 21, 31, left and right, respectively, provided in body 10. Arms 20, 30 can rotate as a compass between a first open position (FIG. 3), in which two respective free ends 22, 32 of arms 20, 30 are spaced from each other, and a second closed position (FIGS. 4 and 12), in which the respective free ends 22, 32 of arms 20, 30 are approached to each other. The first open position promotes the movement of device 1 from and towards an operating gum surface. In the second closed position, the free ends 22, 32 are approached to each other to abut said gum/bone surface. In particular, one of the ends abuts the gum/bone surface on the vestibular side, while the other on the lingual side.

Figure 6:
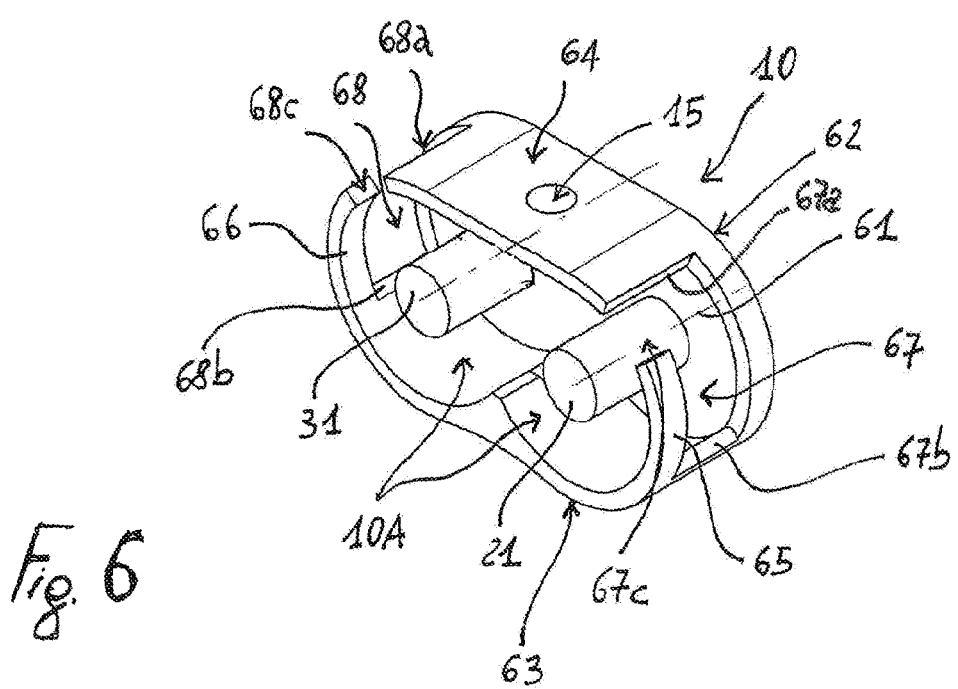
FIGS. 6 and 6A are axonometric views of possible embodiments of a component of a device according to the invention.
Figure 6A:
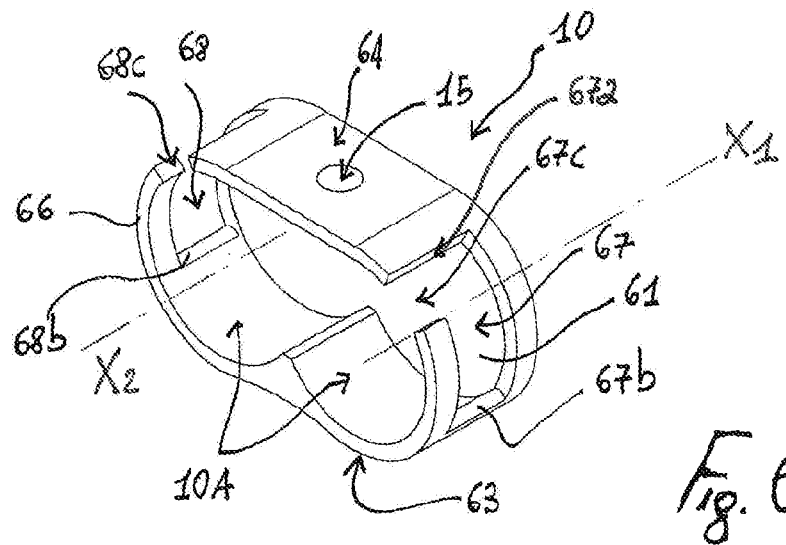

In an alternative embodiment, the two arms 20, 30 can be inserted into body 10 without the latter comprising any pin (see FIG. 6A). In fact, according to the invention, the inner shape of body 10 advantageously defines seats 10A, preferably two, at least partially cylindrical, each adapted to guide in rotation a corresponding one of said arms 20, 30.

Device 1 according to the invention comprises a guiding hole 15 for a dental drill. Such a hole 15 defines/identifies a drilling axis Z. Such a guiding hole 15 is associated with body 10. By the term associated it is meant that hole 15 can be defined through body 10 or alternately defined by a further body permanently connected to body 10. In any case, according to the invention, any movement/rotation of body 10 results in a corresponding movement/rotation in space of the hole 15.

The hole 15 has a diameter within a range of between 1.8 and 2.2 mm to allow the passage of a dental drill. In a possible embodiment, the diameter of the guiding hole may also be up to 5 mm. In this case, suitable adapters may be adapted, insertable in hole 15, for guiding drills with a smaller diameter.

Device 1 further comprises an elastic element 40 adapted to push arms 20, 30 towards the second closed position. The elastic element 40 is constrained to arms 20, 30 and shaped so as to push arms 20, 30 against each other, in particular urging the free ends 22, 32 towards each other, thus counteracting the opposite rotation of arms 20, 30 towards the open position. Thereby, device 1 tends to stably maintain the closed position even when an object, particularly a gum/bone surface 100, is interposed between the free ends 22, 32. This in particular allows to define the positioning of the drilling axis Z stably with respect to the gum/bone surface 100.

With reference to the embodiment of the body in FIGS. 6 and 13, the cylindrical pins 21, 31 of body 10 identify two respective rotation axes X1 and X2, parallel to each other, for arms 20, 30. Such axes X1, X2 are therefore parallel to a first reference direction X (hereinafter referred to as "direction X"), substantially orthogonal to the drilling axis Z and incident thereon. The cylindrical pins 21, 31 can develop by a length, measured along direction X substantially equal to, as in the embodiment shown in FIG. 6, or alternately smaller than, as shown in FIG. 13, the length of body 10, always measured along direction X.

According to what already mentioned above, as shown in FIG. 6A, the two arms 20, 30 can rotate within the partially cylindrical seats 10A without being pivoted to corresponding pins. In other words, the cylindrical pins 21, 31 can be omitted to simplify the structure of body 10.

In any case, each of arms 20, 30 includes, in addition to the first free end 22, 32, a second cylindrical end 27, 37 pivotally coupled to body 10, i.e. inserted into a corresponding one of the seats 10A defined above. For each arm 20, 30, the cylindrical end 27, 37 is opposite with respect to the corresponding free end 22, 32.

In a first possible embodiment shown in FIGS. 1-5 and 9, each of arms 20, 30 further comprises a curved intermediate portion 29, 39 of connection between ends 22, 27 and 32, 37, respectively. Instead, in the alternative embodiment shown in FIGS. 10 to 14, each of the two arms 20, 30 comprises an intermediate portion 29B, 39B with rectilinear profile.

In any case, therefore, each of the two arms 20, 30 comprises an intermediate portion 29, 29B, 39, 39B which develops between the corresponding free end 22, 32 and corresponding cylindrical end 27, 37. The configuration of the intermediate portion 29, 29B, 39, 39B is preferably the same for the two arms 10, 20. In the embodiment shown in FIGS. 1 to 5 and in that in FIGS. 10 to 13, in order to allow the rotation with respect to body 10, the second cylindrical ends 27, 37 comprise respective holes 28, 38 coupled to pins 21, 31, respectively. When instead body 10 is not provided with such pins 21, 31 (example in FIG. 6A), the cylindrical ends 27, 37 may be without such holes. It is noted that even in the absence of pins 21, 31, for each arm 20, 30 the corresponding cylindrical end 27, 37, once inserted in one of seats 10A still rotates about a rotation axis X1, X2 configured by the coupling between the two parts (cylindrical end 27, 37 and seat 10A).

In any case, according to the invention, the cylindrical end 27, 37 comprise respective toothed sectors 25, 35 meshed with each other. The toothed sectors advantageously allow the two arms 20, 30 to rotate synchronously about the corresponding rotation axes X1, X2. The extension of the toothed sectors 25, 35 along the surface of the cylindrical ends 27, 37 about axes X1, X2 determines the maximum angular travel of the rotation of arms 20, 30 about the respective pins 21, 31 and consequently, the distance between the closed and open positions of device 1.

The two cylindrical ends 27, 37 and the two intermediate portions 29, 39, 29B, 39B of arms 20, 30 are symmetric/mirror, respectively, with respect to a median plane XZ of device 1, passing by the drilling axis Z parallel to the rotation axes X1, X2 and equidistant therefrom.

The free ends 22, 32 can be different from each other, i.e. a free end (for example the free end 22 on the right, in the embodiment example of the accompanying FIGS. 1-5) more extended than the other free end (the free end 32 on the left, in the embodiment example of the accompanying figures) along the direction X. Alternatively, as shown in FIGS. 10 to 13, the two free ends 22, 32 may have the same extension as measured along direction X.

Preferably, on one of the free ends 22, 32, for example on the right free end 22, a first matching means 23 and a second matching means 24 are provided, while on the other one of the free ends 22, 32 (for example, in the embodiment example in the accompanying figures, on the left free end 32), a third matching means 33 is provided. The first, second and third matching means 23, 24, 33 are mutually arranged so as not to be mutually aligned, so as to define, when device 1 is in the closed position, a reference plane XY of device 1, fixed with respect to the drilling axis Z.

In particular, in the embodiment example of the accompanying figures, the base plane XY is orthogonal to the drilling axis Z. In other embodiment variants, not shown, the drilling axis Z may be otherwise inclined with respect to the base plane XY, according to specific operating requirements.

The free ends 22, 32 may also have the same extension as measured along direction X and have the same number of matching means.

In a possible embodiment variant shown in the accompanying FIG. 1-5, the first, second and third matching means 23, 24, 33 consist of tips (hereinafter indicated with the same reference numerals 23, 24, 33) which can be removably coupled, for example by threaded coupling or interference coupling, to the respective free ends 22, 32. Tips 23, 24, 33 are made of sterilizable, metal or plastic material. The tips define respective abutment axes Y, parallel to each other but not aligned, lying on the base plane XY when device 1 is in the closed position. In particular, the three tips 23, 24, 33, by virtue of their mutual arrangement, define a sort of tripod that advantageously improves the operational stability of the device, as noted hereinafter.

In the closed position, the first, second and third matching means 23, 24, 33 are susceptible to abut, in operation inside the patient's mouth, the gum/bone surface 100. In the example in the accompanying FIGS. 2 and 4, tips 23 and 24 on the right free end 22 abut the lingual side of the gum/bone surface 100, while tip 33 on the left free end 32 abuts the vestibular side of the gum surface 100. According to another embodiment variant (not shown), device 1 can be used rotated by 180°, or with tips 23 and 24 on the right free end 22 abutting the vestibular side of the gum surface 100 and tip 33 on the left end free 32 abuts the lingual side.

According to another possible variant (not shown), tips 23, 24, 33 can be rigidly connected to the corresponding free end 22, 32.

In the alternative embodiment shown in FIGS. 10 to 14, at least one tip could be integral to a support pivotally coupled to the corresponding free end 22, 32. To this end, said at least one tip may also be integrally defined to said support.

With reference to FIGS. 10 and 13, tip 33 is integral to a first support 32B connected through a first fastening means 55 (such as a screw or pin) to the free end 32 of the left arm (second arm 30). Tips 23 and 24 are integral, in opposite position, to a second support 22B connected through a second fastening means 56 (such as a screw or pin) to the free end 23 of the right arm (first arm 20).

In particular, the second fastening means 56 pivotally connects the second support 22B to the free end 22. Thereby, the second support 22B can rotate with respect to the free end 22 about a rotation axis T (FIG. 12). The latter is preferably orthogonal to the base plane XY, considering arms 20, 30 in closed position. This solution advantageously allows tips 23, 24 to be adapted to the shape of the maxillary/mandibular bone, thus increasing the adherence and therefore the stability of the contact.

In the embodiment shown in FIGS. 10 to 13, the first support 32B and/or the first fastening means 55 are configured so that, following the connection with the free end 33 of the second arm 30, tip 23 maintains a fixed position i.e. does not rotate with respect to the free end 33 itself. In other words, the two parts (55 and 32B) form a rigid coupling. However, in an alternative embodiment, the first support 32B and/or the first fastening means 55 may also allow a rotation of tip 33.

In the embodiment shown in the figures, the two matching means 23, 24 associated with the free end 22 of the first arm 20 therefore are not mirror to the matching means 30 associated with the free end 33 of the second arm 33. However, in a possible embodiment not shown, the matching means associated with a free end 22 or 32 of one of arms 20 or 30 may be mirror, in terms of position and number, to those associated with the free end the other arm (30 or 20) with respect to plane XZ indicated above.

In all cases, in the closed position, the gum surface 100 is preferably abutted by a further concave matching surface 16 provided on body 10 in a position facing towards the base plane XY. According to another embodiment variant of the invention (not shown), the matching surface 16 is flat.

Figure 1:
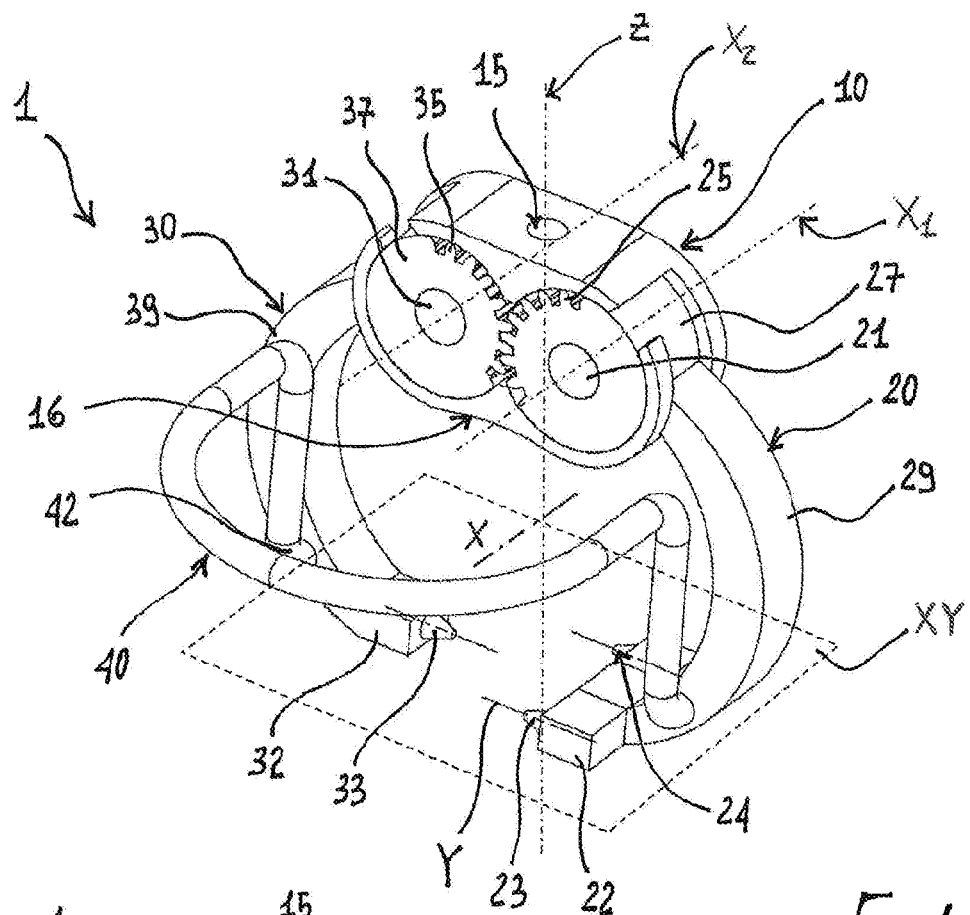
FIG. 1 is an axonometric view of a first embodiment of a guiding and centering device for a dental drill, according to the present invention.
Figure 2:
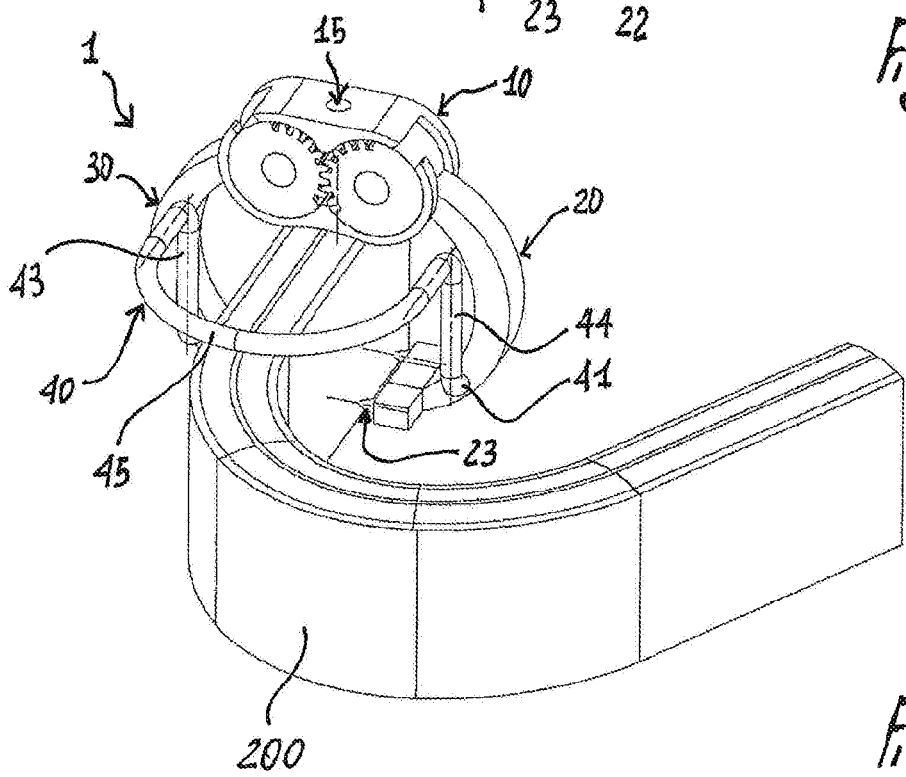
FIG. 2 is an axonometric view of the device in FIG. 1 in operation.
Figure 4:
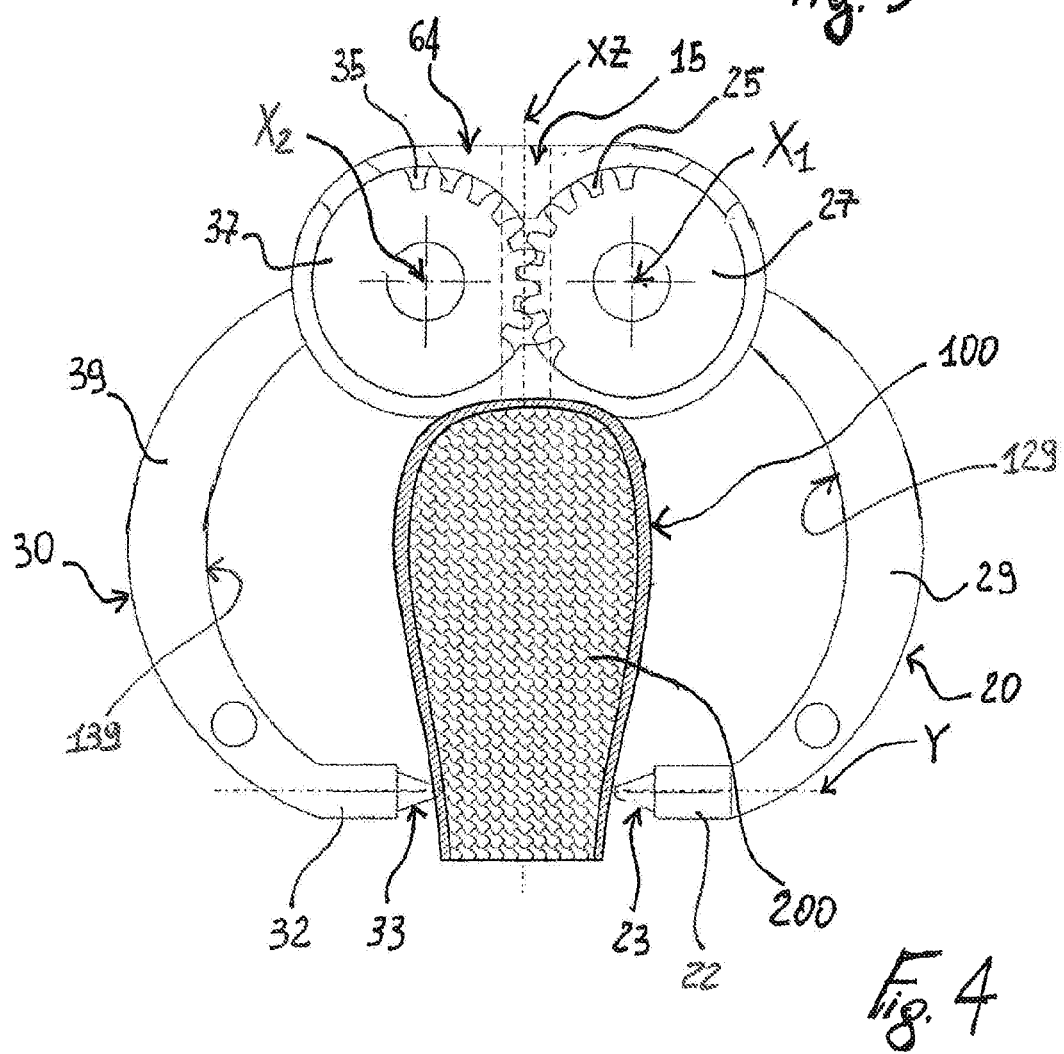
FIGS. 4 and 5 are front views of the device in FIG. 1 in possible conditions of use.

With reference to the embodiment shown in FIGS. 1 to 5, the curved shape of the intermediate portions 29, 39 of arms 20, 30 allows them to be arranged along the sides of the gum surface 100 without being in contact therewith. The contact between the gum surface 100 and the matching means 23, 24 and 33 and the matching surface 16 allows device 1 to be correctly positioned and centered, in operation, with respect to the gum surface 100 and thus also with respect to the underlying mandibular bone 200 (FIGS. 2 and 4).

According to a similar principle and for the same purpose, the embodiment shown in FIGS. 10 to 14, when the device is in the closed position the distance Y1 between the inner sides 229B, 239B of the intermediate portions 29, 39 of the two arms 20, 30 is greater than width Y2 of body 10 of device 1. Distance Y1 and width Y2 are measured along a second reference direction Y (or direction Y) substantially orthogonal to plane XZ and when arms 20, 30 take a closed position (see, in particular, FIG. 10).

In general, according to this aspect of the invention, for each of the two arms 20, 30 the corresponding intermediate portion 29, 39, 29B, 39B comprises at least one central stretch defining an inner side 129, 139, 229B, 239B. In particular, the distance in direction Y between the inner sides 129-139 and 229B-239B of the intermediate portions 29, 39, 29B, 39B of the two arms 20, 30 is greater than the width of body 10 of device 1 in direction Y (considering arms 20, 30 in closed position).

According to the invention, in use, the correct position of device 1 can be easily maintained due to the action of the elastic element 40, which pushes arms 20, 30 towards the closed position. This therefore allows, in particular, to orient and maintain the drilling direction Z properly. After the positioning of device 1, the drilling of the mandibular bone 200 can take place by inserting the dental drill through hole 15, preferably defined through body 10.

Figure 5:
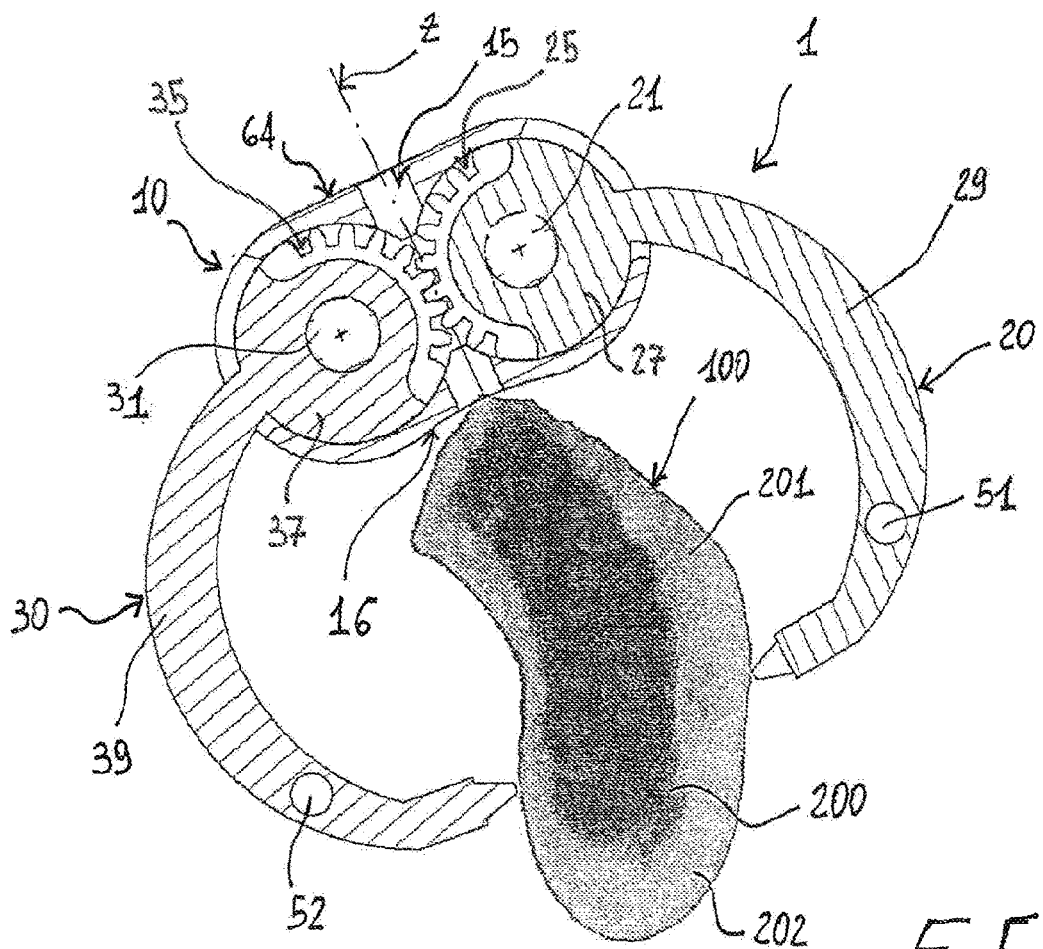

With reference to FIG. 5, it is noted that device 1 according to the invention defines the orientation of the drilling direction Z also if the mandibular bone 200 has a rather complex morphology. FIG. 5, for example, shows an image (CT scan) of a mandibular bone 200 having a markedly inclined upper portion 201 with respect to the lower one 202. By leaning the matching surface 16 against the upper portion 201, device 1 is autonomously oriented due to the action of the two arms 20, 30 against the opposite walls (vestibular and lingual) of bone 200. In particular, this orientation results in the definition of a drilling direction Z which crosses the bone structure in the central area, ideal for providing the dental implant. It is understood that the same result can be obtained with the device in the embodiment shown in FIGS. 10-14.

Figure 7:
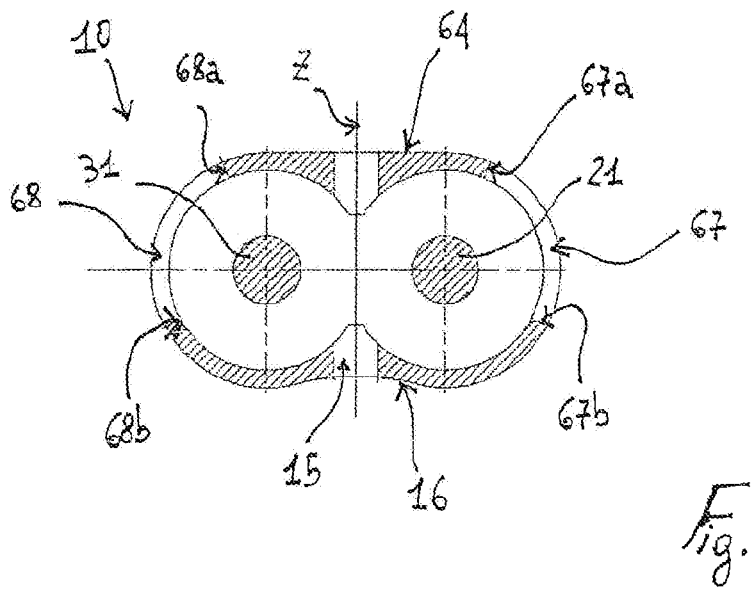
FIGS. 7 and 7A are sectional views of the component shown in FIGS. 6 and 6A, respectively.

With reference to FIGS. 6, 7 and 13, preferably body 10 comprises a rear base surface 61 from which pins 21, 31 are orthogonally protruding. From the outer edge of the rear base 61, parallel to pins 21, 31, a peripheral wall 62 further protrudes, delimiting a volume within body 10. The inner volume accommodates the cylindrical ends 27, 37 of arms 20, 30 with the respective holes coupled to pins 21, 31, respectively.

Figure 7A:
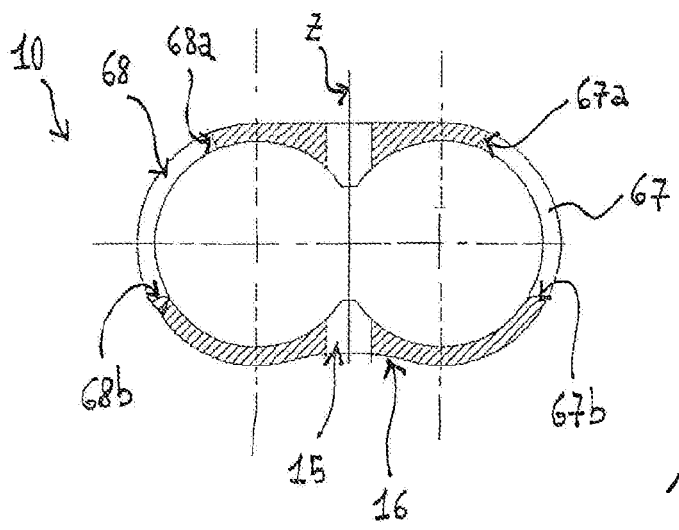

In the embodiment shown in FIGS. 6A and 7A, body 10 has the same configuration, but with no pin protruding from the rear base 61. For the rest, body 10 substantially corresponds to that described for FIGS. 6 and 7. In particular, in all cases body 10 defines seats 10A defined above which accommodate the cylindrical ends 27, 37 guiding the rotation thereof.

In the embodiment shown in FIGS. 1 to 6, the peripheral wall 62 comprises a lower wall 63 facing towards the base plane XY, on which the matching surface 16 is provided and on the opposite side, an upper flat wall 64. The guiding hole 15 extending through both the lower wall 63 and the upper wall 64. The peripheral wall 62 further defines two lateral walls 65, 66 at least partly cylindrical, right and left respectively, connecting the matching surface 16 and the upper wall 64. Such lateral walls 65, 66, together with the rear base 61, configure seats 10A defined above within which the cylindrical ends 27, 37 are accommodated. The lateral walls 65, 66 define two circumferential openings 67, 68 from which the curved intermediate portions 29, 39 of arms 20, 30 protrude. The circumferential openings 67, 68 respectively allow the rotation of arms 20, 30 about the rotation axis defined by the shape of seats 10A and/or by pins 21, 31, when present. Each circumferential opening 67, 68 comprises an upper limit 67a, 68a and a lower limit 67b, 68b. The upper limit 67a, 68a is closer to the upper wall 64 and constitutes the stop end for the respective arm 20, 30, in the open position. The lower limit 67b, 68b is closer to the lower wall 63 and constitutes the stop end for the respective arm 20, 30, in the closed position.

In the variant in FIGS. 1-5, at the upper limit 67a, 68a, each circumferential opening 67, 68 also comprises an axial opening 67c, 68c, parallel to the rotation axes X, through which arms 20, 30 are freely translatable along pins 21, 31, when present, or in any case along an axial direction orthogonal to the drilling axis Z. The axial opening 67c, 68c allows to insert or remove arms 20, 30, respectively into or from seats 10A, when the same arms 20, 30 are in the open position. Thereby, arms 20, 30 are separable from body 10, for example to facilitate the sterilization of body 10 and of arms 20, 30.

According to another embodiment variant (not shown), the axial openings 67c, 68c of openings 67, 68 are not present and arms 20, 30 are thus constrained to body 10 so that the translation in the axial direction is prevented. In such an embodiment variant, device 1 cannot be sterilized and therefore is of the disposable type. In this condition, the device is preferably made of plastic material. In the embodiment shown in FIGS. 10 to 14, body 10 has a slightly different conformation. In essence, body 10 does not comprise the lateral walls 65, 66 indicated above. In body 10 there may however be circumferential openings 670, 680 from which the intermediate portions 29B, 39B of the two arms 20, 30 protrude, which have an extension at least partially rectilinear as already indicated above. The circumferential openings 670, 680 are therefore defined between the lower wall 63, the upper wall 64 and the rear base 61 (see in particular FIG. 13). Moreover, in the embodiment in FIGS. 10-14, the two cylindrical ends 27, 37 of the two arms 20, 30 are attached to the corresponding pins 21, 31 emerging from the rear base 61 through two fastening elements 650, such as screw. Each fastening element 650 is coaxial with a respective rotation axis X1, X2 configured by a corresponding one of pins 21, 31.

Preferably, but not exclusively, the guiding hole 15 is placed at the center of body 10, in particular at the center of the lower 63 and upper 64 walls and therefore of the inner volume of body 10 in which the cylindrical end 27, 37 of arms 20, 30 are accommodated. In the embodiment shown in FIGS. 1 to 5, in order to allow the passage of a dental drill along the guiding hole 15, from the upper wall 64 to the lower wall 63, the toothed sectors 25, 35 comprise respective grooves (36 in FIG. 8), aligned with each other and with the guiding hole 15. The grooves allow the passage of a dental drill through body 10 in all positions of arms 20, 30, in particular in the second closed position, used during the drilling operations, when device 1 is coupled with the gum surface 100 and the mandibular bone 200.

In the embodiment shown in FIGS. 10 to 14, in order to allow the passage of the tool through body 10, for each arm 10, 20, the corresponding cylindrical end 27, 37 comprises a first portion 27A, 37A defining the corresponding toothed sector 25, 35 and a second portion 27B, 37B recessed with respect to the first portion 27A, 37A and having a diameter such as to define, partially or completely, a passage for the dental drill. In particular, when the cylindrical ends 27, 37 are inserted in the respective seats 10A, the second portion 27B of the first cylindrical end 27 and the second portion 37B of the second cylindrical end 37 are spaced by a distance Y3 (as measured along direction Y) sufficient to allow the passage of said dental drill. According to other embodiment variants of the invention (not shown), the guiding hole 15 does not cross the inner volume of body 10, but is displaced with respect to it, while being positioned along the median plane XZ of device 1. For example, with reference to FIG. 6, the hole 15 could be placed beyond the rear base 61, so that this is interposed between hole 15 and the inner volume, or in front of pins 21, 31, so that the distance between hole 15 and the rear base 61 is greater than the length of pins 21, 31. In these embodiment variants, the grooves through the toothed sectors 25, 35 (grooves provided in the embodiment shown in FIGS. 1 to 5) are not provided, as they are not necessary, nor the embodiment of the cylindrical end 27, 37 shown in FIGS. 10 to 14 is necessary.

According to another aspect of the present invention, the elastic element 40, of sterilizable plastic or metal material, is symmetrical with respect to the median plane XZ of device 1. In the embodiment shown in FIGS. 1 and 2, the elastic element 40 consists of:

two curved ends 41, 42 respectively couplable by insertion with two coupling holes 51, 52 provided along the intermediate portions 29, 39 of arms 20, 30, respectively, two rectilinear stretches 43, 44, respectively adjacent to the curved ends 41, 42, both oriented parallel to the drilling axis Z, a central U-shaped stretch 45, lying parallel to the base plane XY, which connects the two rectilinear stretches 43, 44.

The two rectilinear stretches 43, 44 allow the elastic element 40 not to interfere with the gum surface 100 and with the adjacent teeth when device 1 is coupled thereto. The stiffness of the rectilinear stretches 43, 44 and of the central stretch 45 imparts the elastic properties of the elastic element 40.

The coupling between the curved ends 41, 42 and the coupling holes 51, 52 allows to couple the elastic element 40 to arms 20, 30 in a removable manner. To this end, each of the intermediate portions 29, 39 of arms 20,30 may comprise a plurality of coupling holes to increase the operational versatility of the centering device. For example, in the embodiment shown in FIG. 3, the intermediate portions 29, 39 of arms 20, 30 define two pairs of holes 51-52 and 51A-52A which allow at least two possible ways of coupling the elastic element 40. It is noted that also the elastic element 40 may be separable from arms 20, 30, for example to be sterilized separately with respect to arms 20, 30.

FIGS. 13 and 14 show a preferred variant of the elastic element 40 which has two lateral portions 143, 144 and a central portion 145, wherein the central portion 145 has a curvature opposite to that of the lateral portions 143, 144, and wherein the radius of curvature of the central portion 145 is smaller (preferably significantly smaller) than the radius of curvature of the two lateral portions 143, 144. These latter comprise ends 141, 142 insertable into corresponding holes 151, 152 preferably provided along the intermediate portions 29B, 39B of the two arms 20, 30.

Preferably, in this embodiment, the rear base 61 of body 10 defines a seat 61B delimited, at least partially, by a support surface comprising a central portion 611 shaped geometrically conforming to the central portion 145 of the elastic element 40 and two lateral portions 612, 613 shaped geometrically conforming to a portion of the lateral portions 143, 144 of the elastic element 40 adjacent to the central portion 145 thereof.

Following the assembly of device 1, the central portion 145 of the elastic element 40 therefore rests against the central portion 611 of the support surface, while the lateral portions 143, 144 partially rest on the lateral portions 612, 613 of the support surface. The rest of each of the lateral portions 143, 144 remains adjacent to the corresponding intermediate portion 29, 39 of the corresponding arm 20, 30. Preferably, the central portion 145 of the elastic element 40 remains fully accommodated in body 10 between the lower wall 3 and the upper wall 64, while the two lateral portions 143, 244 remain partially accommodated in body 10 and partially adjacent, outside of body 10, to the corresponding intermediate portions 29, 39, 29B, 39B.

Following the conformation assigned to portions 145, 143, 144 of the elastic element 40, the lateral portions 143, 144 exert a return force on the two arms 20, 30 towards the closed position. In order to open the two arms 20, 30, a clamp tool (not shown) may be used which interacts with arms 20, 30 at suitable action points 178. Such a clamp will exert an opening force, that is in contrast with the action of the elastic element 40.

In the embodiment shown in FIGS. 1 to 5, device 1 is of the reusable type, being separable in the following individually sterilized components:
body 10;
the right arm 20 and the left arm 30 separable from body 10 by sliding along the axial openings 67c, 68c of openings 67, 68,
the three tips 23, 24, 33,
the elastic element 40.

In the embodiment shown in FIGS. 10 to 14, in addition to the components listed above, the fixing elements 55, 56 of supports 22B, 32B of the matching elements 23, 24, 33 and the fastening elements 650 used to block the cylindrical ends 27, 37 to pins 21, 31 are also sterilizable.

According to an alternative embodiment, not shown in the figures, device 1 may also be of the disposable type.

The present invention also relates to a kit for the insertion of a dental implant comprising at least one centering device according to the present invention. In this regard, FIGS. 15 to 21 relate to possible components of a kit according to the invention which can be operatively associated with the centering device according to the invention. Preferably, the kit according to the invention, in addition to the centering device comprises at least one of the components described below. Even more preferably, the kit according to the invention, in addition to the centering device comprises a plurality of the components described below.

With reference to FIG. 15, the kit according to the invention may comprise a spacer plate 80, connectable to body 10, preferably to the outer side of the rear base 61 or on a front surface. Such a spacer plate 80 may have different thicknesses and may therefore be connected to body 10, preferably in a removable manner. The use of a spacer plate 80 advantageously allows to adjust the position of the dental implant with respect to the closer tooth 99 (indicated in FIG. 15).

It is noted that in a possible embodiment, the centering device 1 according to the invention may already comprise a spacer plate 80 rigidly or removably connected to body 10.

With reference to FIG. 16, the kit according to the invention may also comprise a reference element 85 connectable, directly or indirectly, to body 10. Such a reference element 85 is preferably defined by a body which defines/identifies a development direction 501 along which such an element 85 mainly extends. According to a first variant, shown in FIG. 16, the reference element 85 can be connected to body 10 of the centering device 1 so that such a development direction 501 is parallel to the drilling direction Z. In this regard, element 85 preferably emerges from a base 86 connected to body 10, even more preferably to the outer side of the rear base 61. If there is the need to install dental implants in a close position, a first implant 82 is made to which a further reference element 83 is associated. In order to provide the second implant, it is advantageously possible to use the reference element 85 associated with body 10 to correct/define the orientation of device 1 with reference to the reference element 83 associated with the first implant 82. It is noted that the above base 86 as well as said further reference element 83 may also be components of the kit according to the invention.

With reference to FIG. 17, according to a further variant, the reference element 85 is configured so as to be connectable to body 10 of the centering device 1 so that its development direction 501 is inclined with respect to the drilling axis z by an angle α of between 25° and 35°. This solution is particularly useful for example if there is the need to prepare four dental implants for the replacement of teeth of the lower dental arch. In this case, the normal implantation technique involves two central implants, for which a drilling of the bone structure is made in a direction substantially normal to the plane of the teeth, and two more lateral implants which must be installed in a position between that of the adjacent dental implant and that of the corresponding mental foramen. In order to prevent contact with the nerves passing through the mental foramen, for the lateral implants it is necessary to make a perforation in a direction inclined by about 25°-35° with respect to the normal direction followed for central implants. FIG. 17 schematically shows a central implant (indicated with reference numeral 82) to which a further reference element 83 is associated. In order to provide the lateral implant, the reference element 85 associated with body 10 of device 1 may be used. In particular, device 1 may be inclined so that said reference element 85 is parallel to the reference element 83 associated with the central implant 82. Thereby, the drilling axis Z of device 1 takes the orientation (25°-35° with respect to the normal) required by the implantation technique.

It is noted that in a possible embodiment, the centering device 1 according to the invention may already comprise the reference element 85 connected to body 10 in a rigid or removable manner.

FIGS. 18 to 21 relate to a further kit according to the invention. This may comprise at least one drill 90 adapted to be guided within hole 15 of the centering device 1. With reference to FIG. 18, the drill preferably comprises at least one graduated portion 91 (such as in mm). The latter comprises a plurality of spaced (for example 1 mm) notches 93, each of which to indicate a penetration depth of the drill into the tooth. It is noted that notches 93 are defined starting from a certain distance L from the end of the drill. Such a distance substantially corresponds to the length of the guiding hole 15 defined through body 10 of the centering device 1. With reference to FIG. 19, the kit according to the invention may also comprise a spacer element 95 provided with an axial cavity the axis of which can be aligned with that of the guiding hole 15. The spacer element 95 has the function of defining a depth stop, or the programmed drilling depth. In particular, the spacer element 15 has the function of abutting against the upper wall 64 of body 10 of device 1 as shown in FIGS. 15 and 16. It is noted that for the same centering device 1 considered, length L1, L2 of the spacer element 95 defines the drilling length/depth L1*, L2*. To this end, FIG. 20 shows a spacer 95 of length L1 smaller than length L2 of spacer 95 shown in FIG. 21. It follows that the spacer in FIG. 20 will define a drilling length/depth L1* greater than that (indicated with L2*) defined by the spacer in FIG. 21. In practice, with the same centering device, with increasing length of the spacer, the drilling depth decreases. In a further embodiment, if the guiding hole of the centering device 1 is greater than 2 mm, the kit according to the invention may also comprise an adapter element (not shown in the figures) to guide drills of smaller diameter than those of said guiding hole. This element will have at least one cylindrical portion insertable into the guiding hole and comprising a through inner hole having a diameter corresponding to the diameter of the drill to be used.

Also in this case, it is noted that in a possible embodiment, the centering device 1 according to the invention may already comprise a spacer element 95 connected to the body 10 in a rigid or removable manner.

In a further variant, the kit according to the invention, in addition to the centering device, comprises at least one support 22B, 32B of a matching element 23, 24, 33 and at least one fastening means 55, 56 to connect such a support 22B, 32B to a free end 22, 32 of one of arms 20, 30 of device 1. Preferably, the kit according to the invention comprises a plurality of supports and a plurality of fastening means. The above-described device allows to fully achieve the intended tasks and objects. In particular, the device according to the invention can be advantageously used also for providing a single implant with absolutely accessible costs and without requiring the implementation of any template or other equivalent means. The device according to the invention also allows to drill the bone defining a centered drilling direction with respect to the maxillary/mandibular structure.

The invention claimed is:

1. A centering device for inserting a dental implant comprising:
   a body;
   a guiding hole associated with said body,
   two arms pivotally constrained to said body and including two respective free ends, said arms being rotating between a first open position, in which said respective free ends are mutually spaced apart to promote the movement of the device from and towards an operating surface, and a second closed position, in which the free ends are approached to each other to match an operating surface,
   an elastic element to push the arms towards said closed position, wherein each of said arms comprises a cylindrical end opposite to the corresponding free end, said body configuring at least partially cylindrical seats in which said cylindrical ends of said arms are accommodated, and wherein the cylindrical ends of said arms comprise respective toothed sectors mutually meshing each other to guide the rotation of said arms between said open and closed positions.

2. The device according to claim 1, further comprising:
   a first and a second abutment on one of said free ends and at least a third abutment on the other of said free ends, said first, second and third abutment being mutually arranged so as to define a base plane (XY) of said device when said arms are in said closed position.

3. The device according to claim 2, wherein said base plane (XY) is orthogonal to said guide hole.

4. The device according to claim 1, wherein said body comprises a pair of pins, said arms being capable of pivoting about a corresponding one of said pins.

5. The device according to claim 1, wherein said body is shaped so that said arms are free to translate along a direction orthogonal to the axis of said hole when said arms are in a position other than said closed position.

6. The device according to claim 1, wherein said toothed sectors comprise respective grooves aligned with said guiding hole, so as to allow the passage of a dental drill through said body at least when said arms are in said second closed position.

7. The device according to claim 1, wherein for each of said arms, the respective cylindrical end comprises a first portion defining a corresponding toothed sector and a second portion radially recessed with respect to said first portion so as to define a passage for a dental drill through said body at least when said arms are in said closed position.

8. The device according to claim 1, wherein said body comprises a concave or flat matching surface, facing towards said base plane (XY) and susceptible of matching a gum or bone surface when said device is operating in said second closed position.

9. The device according to claim 2, wherein said first, second and third matching means are removable tips with respect to said respective free ends.

10. The device according to claim 2, wherein at least one of said matching means is integral with a support connected through a fastening means to a corresponding free end of one of said arms.

11. The device according to claim 10, wherein said support is pivotally connected to said corresponding free end.

12. The device according to claim 10, wherein said support is rigidly connected to said corresponding free end.

13. The device according to claim 1, wherein said body comprises:
- a rear base surface;
- a peripheral wall protruding from said rear base and which delimits said seats for said cylindrical ends of said arms, said peripheral wall comprising a lower wall and an upper wall opposite to said lower wall, said guiding hole passing through said lower wall and said upper wall;
- circumferential openings from which the intermediate portions of said arms, respectively, protrude.

14. The device according to claim 13, wherein said pair of pins protrudes from said rear base.

15. The device according to claim 1, wherein each of said arms comprises a respective coupling hole coupled to a respective end of said elastic element.

16. The device according to claim 1, wherein said elastic element comprises two lateral portions and a central portion, wherein the central portion has a curvature opposite to that of the lateral portions, and wherein the radius of curvature of the central portion is smaller than the radius of curvature of the two lateral portions, said lateral portions comprise ends insertable into corresponding holes provided on said arms.

17. The device according to claim 16 wherein said body comprises a rear base surface defines a seat delimited, at least partially, by a surface comprising a central part (611) shaped geometrically conforming to said central portion of said elastic element and two lateral parts shaped geometrically conforming to a portion of said lateral portions of said elastic element adjacent to said central portion thereof, and wherein said central portion of said elastic element rests on said central portion and said lateral portions of said elastic element rest at least partially on said lateral portions.

18. The device according to claim 1, wherein said device comprises at least one spacer plate connected to said body of said device.

19. The device according to claim 1, wherein said device comprises at least one reference element which defines a development direction, said reference element being integral with said body so that said development direction is either parallel to the axis of said hole or inclined by a predetermined angle with respect to the same axis of said hole.

20. A kit for providing a dental implant characterized in that it comprises a device according to claim 1 and at least one dental drill adapted to be guided through said guiding hole of said device.

21. The kit according to claim 20, wherein said kit further comprises a spacer element comprising a longitudinal cavity which can be crossed by said drill, said spacer element defining a stop position for the advancement of said drill once it abuts against an upper wall of said body from which said guiding hole develops.

22. The kit for providing a dental implant characterized in that it comprises a device according to claim 1 and at least one spacer plate connectable to said body of said device.

23. The kit for providing a dental implant characterized in that it comprises a device according to claim 1 and at least one reference element which defines a development direction, said reference element being integral with said body so that said development direction is either parallel to the axis of said hole or inclined by a predetermined angle with respect to the same axis of said hole.

24. The kit for providing a dental implant characterized in that it comprises a device according to claim 1 and at least one support which is integral with a matching means, said kit further comprising at least one fastening means for fastening said at least one support to a corresponding free end of one of said arms.

* * * * *